United States Patent
Trümmel

Patent Number: 5,449,468
Date of Patent: Sep. 12, 1995

[54] METHOD AND APPARATUS FOR DISLODGING A CAKE OF A CHAMBER FILTER PRESS

[75] Inventor: Fritz Trümmel, Jona, Switzerland

[73] Assignee: Gerhard Trummel, Monchaltorf, Switzerland

[21] Appl. No.: 111,819

[22] Filed: Aug. 25, 1993

[30] Foreign Application Priority Data

Aug. 27, 1992 [CH] Switzerland .............. 02 659/92

[51] Int. Cl.⁶ .................. B01D 25/164; B01D 25/34
[52] U.S. Cl. .................. 210/770; 210/785; 210/225; 210/352; 210/388; 100/199
[58] Field of Search ............ 210/770, 785, 791, 224, 210/225, 232, 350, 352, 357, 388; 100/198, 199

[56] References Cited

U.S. PATENT DOCUMENTS

| | | |
|---|---|---|
| 3,669,273 | 6/1972 | Kurita . |
| 4,664,797 | 5/1987 | Kurita ............ 210/225 |
| 4,710,293 | 12/1987 | Davis ............ 210/225 |
| 4,842,733 | 6/1989 | Kurita ............ 100/198 |
| 4,874,512 | 10/1989 | Brown ............ 100/199 |
| 4,900,454 | 2/1990 | Healund et al. ............ 210/225 |

FOREIGN PATENT DOCUMENTS

| | | |
|---|---|---|
| 0177170 | 4/1986 | European Pat. Off. . |
| 971456 | 9/1964 | United Kingdom . |
| 1523102 | 8/1978 | United Kingdom . |
| 8906155 | 7/1989 | WIPO . |

Primary Examiner—Robert A. Dawson
Assistant Examiner—W. L. Walker
Attorney, Agent, or Firm—Cushman Darby & Cushman

[57] ABSTRACT

In a chamber filter press (11), two respective filter cloths (13), which enclose a filter plate (12) located therebetween, are fastened on said plate by means of a connecting part (18) and on the underside (19) thereof by means of lashings (14). The filter cloths (13) are free laterally with respect to the filter plates (12) and, when the chamber filter press (11) is open, they can be stretched apart from one another. The upper ends of the filter cloths (13) are provided with eyelets (20). In this arrangement, two adjacent filter cloths (13', 13") are fastened together on a series (21') of springs (21) which, for their part, are suspended on a mobile crossmember (22). The latter is supported on the chamber filter press such that it can be displaced parallel to the charging channel (17) and can move vertically. It is preferably supported on sliding guides or rails (23) which, for their part, may be supported on the chamber filter press (11) such that they can move in the vertical direction. Springs (21), assigned to two adjacent filter cloths (13', 13") and to a common crossmember (22), preferably have different degrees of hardness. A photocell (27) and a light source may be arranged beneath the filter plates (12). When the chamber filter press (11) is open, the crossmember (22) is lowered and raised up, preferably shaken, by a displacement intended to produce shear forces. In addition, said crossmember may be lowered and raised up in order alternately to relax the filter cloths (13) and tighten them.

10 Claims, 2 Drawing Sheets

METHOD AND APPARATUS FOR DISLODGING A CAKE OF A CHAMBER FILTER PRESS

BACKGROUND OF THE INVENTION

1. Field of Invention

The invention relates to a method and an apparatus for dislodging the cake of a chamber filter press. In a chamber filter press, two respective filter cloths which enclose a filter plate located therebetween, are fastened on said plate by means of a connecting part and on the underside thereof by means of lashings. The filter cloths are free laterally with respect to the filter plates and, when the chamber filter press is open, they can be stretched apart from one another. The upper ends of the filter cloths are provided with eyelets. In this arrangement, two adjacent filter cloths are fastened together on a series of springs which, for their part, are suspended on a mobile crossmember. The latter is supported on the chamber filter press such that it can be displaced parallel to the charging channel and can move vertically. It is preferably supported on sliding guides or rails which, for their part, may be supported on the chamber filter press such that they can move in the vertical direction. Springs assigned to two adjacent filter cloths and to a common cross member preferably have different degrees of hardness. A photocell and a light source may be arranged beneath the filter plates. When the chamber filter press is open, the cross member is lowered and raised up, preferably shaken, by a displacement intended to produce shear forces. In addition, said crossmember may be lowered and raised up in order alternately to relax the filter cloths and tighten them.

Chamber filter presses have been used for a long time in various industries for separating sludge into solid and liquid portions. Depending on the type of sludge, the sludge cake is dislodged automatically, with manual assistance or with the aid of apparatuses for dislodging the cake.

2. Description of the Prior Art

Nowadays, chamber filter presses are also used in the waste industry and in the basic-material industry. Chamber filter presses are used in the gravel industry, for example, in order to dewater the partly clay-containing sludges produced when washing gravel. As a result, process water is re-used to a large extent and a largely problem-free disposal of the solids, occurring in the form of sludge cakes, is achieved. The sludge cake may, however, be very sticky, this, as a rule, preventing it from being dislodged automatically. Since the matter in hand concerns waste disposal, a supervisor, who would assist in dislodging the cake, if appropriate by manual intervention, has to be dispensed with on the grounds of cost.

A reliable and automatic apparatus for dislodging the cake of the chamber filter press is thus a prerequisite in order to be able to operate a chamber filter press around the clock. Even if only a single cake or cake portion remained attached on the filter cloth, there could be a danger of the press, in the next operating cycle, not being tightly sealed and of the sludge therefore escaping from the leakage point when the press is re-charged, and this would generally have grave consequences.

SUMMARY OF THE INVENTION

In order to illustrate this problem, FIG. 1 shows, in a simplified example, the cake being dislodged in a chamber filter press according to the prior art. In this prior art, filter plates 2 are sheathed in filter cloths 3 in a chamber filter press 1 a section of which is represented. These filter cloths 3 are designed as stretch-through cloths which, when the chamber filter press 1 is open, are fitted between the filter plates 2 and, thereafter, are fastened in twos, by means of lashings 4, on the filter plate 2 located therebetween. When the chamber filter press 1 is closed, cakes, such as, for example, a cake 5, are produced, as the filter process progresses, between two respective filter plates 2 or the corresponding filter cloths 3 located thereon. The chamber filter press 1 is charged, as shown in FIG. 1, approximately in the center of the filter plates 2 or of the filter cloths 3 via a charging channel which is formed when the chamber filter press 1 is closed and comprises lined-up channel portions 7 of the filter plates 2. Moreover, there are arranged, in said channel portions 7, so-called collars 8 which are designed as tubular connecting parts and are connected, on both sides of a filter plate 2 in each case, to the two corresponding filter cloths 3, this causing the filter cloths 3 to be fastened onto the relevant filter plate 2 in the region of the channel portions 7. When the chamber filter press 1 is open again, cakes can fall downwards automatically, as is shown, for example by a cake 6. However, cakes or cake portions may remain attached on the filter cloths 3, as is shown, for example, by the cake 5.

Measures, which aim to prevent cake or cake portions from remaining attached on the filter cloths, are already known.

A known procedure for dislodging the cake in a chamber filter press is the so-called stretching-cloth method, chamber filter presses suitable for carrying out said method being commercially available. Chamber filter presses of this type are charged via a charging channel which is arranged at a considerable distance beneath the center of the filter plates and of the filter cloths. When operating chamber filter presses, it has been established that the filter cake, in practice, remains attached only above the charging channel. Here too, the filter cloths are fastened in twos on the filter plate located therebetween, but are fastened only on an underside of the corresponding filter plate by means of the lashings and in a lower region of the filter plate, in the region of the charging channel, by means of the tubular connecting part or collar. On the other hand, the filter cloths are free laterally with respect to the filter plate. Above the filter plate, the filter cloths are each fastened on a bearing means, for example are each drawn over a shaped element. After the chamber filter press has been charged, the latter is opened and the filter cloths are stretched with the aid of the shaped elements, in order, due to the resultant angling of the filter cloths in the region of the charging channel, to break up a cake, which may have remained attached, and thus to make it fall downwards. The desired result is, however, not always achieved thereby, i.e. not with any degree of certitude.

The so-called stretching-cloth method is thus supplemented in a known manner in that the filter cloths are alternately lowered and raised up again between the filter plates of the opened chamber filter press with the aid of the shaped elements and of a hydraulic, mechanical or pneumatic device actuating the shaped elements. If the shaped elements are lowered between the filter plates, generally by approximately 20 cm in the case of a typical filter plate of 1500×1500 cm, the filter cloths sag in a sack-like manner since they are, furthermore, fastened onto the relevant filter plate, in the region of the channel portions, by their respective tubular connecting part or collar. When sagging, the filter cloths bend, and this is intended to dislodge a cake, which may have remained attached, from the filter cloth and thus to make it fall downwards. However, even using the above and repeating it a number of times still does not always achieve the desired result with any degree of certitude. In addition, this procedure is very elaborate and therefore expensive.

It is the object of the invention to provide a simple, reliable and thus cost-effective apparatus for dislodging the cake of a chamber filter press.

In order to achieve this object, an apparatus for dislodging the cake of a chamber filter press is characterized according to the invention by the combination of features specified in claim 1. Advantageous developments of the invention are defined in the dependent claims.

The apparatus according to the invention for dislodging the cake of a chamber filter press is particularly suitable for filter presses which open the filter chambers in groups, in accordance with the principle of a concertina, it being possible for up to, for example, 40 plates to be connected to one another, at spacings, in a chamber filter press. It should be pointed out, however, that the invention can be readily transferred to filter presses with single-plate transport.

BRIEF DESCRIPTION OF THE DRAWINGS

In the following, the apparatus according to the invention for dislodging the cake of a chamber filter press is described with reference to the concertina principle of the chamber filter press. In the drawing:

FIG. 2 shows an open chamber filter press 11 provided with the apparatus according to the invention. FIG. 3 is a front view thereof, in which essentially a filter cloth 13 and the apparatus according to the invention are visible.

DESCRIPTION OF PREFERRED EMBODIMENTS

Figure 1:
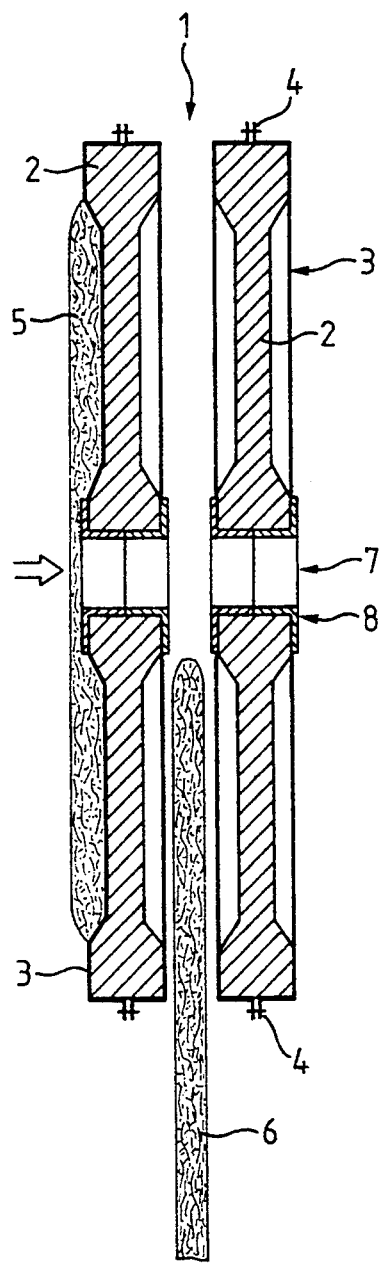
FIG. 1 shows an embodiment of a conventional chamber filter press is a vertical sectional view at right angles to the planes of the filter plates and diametrically through channel portions.

This chamber filter press 11 is charged via a charging channel 17 which, as is known, is arranged at a considerable distance beneath the center of the filter plates 12 and of the filter cloths 13. As is known, the filter cloths 13 are fastened in twos on the filter plate 12 located therebetween. Again, the filter cloths 13 are fastened only on an underside 19 of the corresponding filter plate 12 by means of the lashings 14 and in the lower region of the filter plate 12, in the region of the charging channel 17, by means of the respective tubular connecting part or collar 18, and, again, the filter cloths 13 are free laterally with respect to the filter plate 12.

Above the filter plates 12, the filter cloths 13 are provided with eyelets 20 in which there is suspended in each case a spring 21 which is designed, for example, as a helical spring provided with end hooks and, for its part, is suspended on a mobile crossmember 22. In this arrangement, the respective upper ends of two adjacent filter cloths 13', 13" are fastened together on a series 21' of springs 21. The crossmember 22 is supported on the chamber filter press 11 and can be displaced laterally thereon, for example, as is shown by means of sliding guides or rails 23, fitted on both sides of the chamber filter press 11, and sliding elements or rollers 24 which are arranged at the ends of the crossmember 22 and can run on the sliding guides or rails 23. As is specified in FIG. 3 by the arrows 25, the entire system of sliding guides or rails 23 can move, for example with the aid of a hydraulic, mechanical or pneumatic device, in the vertical direction with respect to the chamber filter press 11. The crossmember 22, the system of springs 21 and the filter cloths 13, suspended at the eyelets 22 on the springs 21, can thus move with respect to the chamber filter press 11 or with respect to the filter plates 12 and they can, inter alia, be alternately lowered and raised up again.

After the chamber filter press 11 has been charged, the latter is opened and the sliding elements correspondingly slide on the sliding guides or the crossmembers 22 roll apart on the rails 23. Each crossmember 22 is set approximately centrally in a gap between two filter plates 12 and the filter cloths 13 are stretched by the increase in the spacings between the crossmembers 22.

In contrast to the known chamber filter press, in which the filter cloths are drawn each over a shaped element above the filter plate in order to dislodge the cake by the so-called stretching-cloth methods and with an additional sagging of the filter cloths, the cake is dislodged from the chamber filter press 11 by the above-described apparatus, in particular by shear forces arising in the vertical direction of the filter cloths 13. These shear forces effect displacements of individual points of the filter cloths 13 with respect to the parts of the cake located thereon, and this results in the cake being dislodged, as is shown, for example, in FIG. 2 by the falling cake 26.

By way of illustration, it could be said that dislodging the cake in a known chamber filter press with shaped elements according to the so-called stretching-cloth method with additional sagging of the filter cloths is equivalent to drawing off the cake from the filter cloth, an analogy being peeling a potato, while, in the case of the chamber filter press with the above-described apparatus according to the invention, dislodging the cake by shear forces is equivalent to the cake being sheared off from the filter cloth, an analogy being peeling an apple or paring rind.

The cited shear forces are caused, on the one hand, by the cake weight which, for example, in the case of typical filter plate of 1500×1500 cm, may amount to 70 to 100 kg, depending on the thickness of the cake; on the other hand, the shear forces are also caused by suspending the filter cloths 13 on individual eyelets 20 and springs 21.

The proportion of shear forces attributable to the suspension of the filter cloths 13 can be further increased in that the springs 21 are provided with different degrees of hardness, with the result that different tensile forces act on the individual eyelets 20 of a filter cloth 13. For example, of seven springs 21 shown in FIG. 3, the second, fourth and sixth are less hard, by approximately 20%, than the first, third, fifth and seventh, the spring hardness being selected such that the loading of the springs 21 by the filter cloth 13, bearing a full cake 26, results in an elastic deformation of the springs 21 which amounts, for example, to approximately half the maximum permissible excursion of the springs 21. Due to the load of the cake suspended thereon, the filter cloth 13 stretches, but it also drops due to the excursion of the springs 21. On account of their different degrees of hardness, the springs 21 exhibit a different spring excursion, even when subjected to the same load, with the result that, when the chamber filter press 11 is opened, there arises in the filter cloth 13 a complex deformation pattern, which changes with the progressive dislodging of the cake. This leads to spatially and temporally variable shear stresses which are beneficial for dislodging the cake.

By virtue of these measures, the majority of the cakes is already dislodged from the filter cloths 13 and made to fall off when the chamber filter press 11 with the above-described apparatus is opened.

Figure 3:
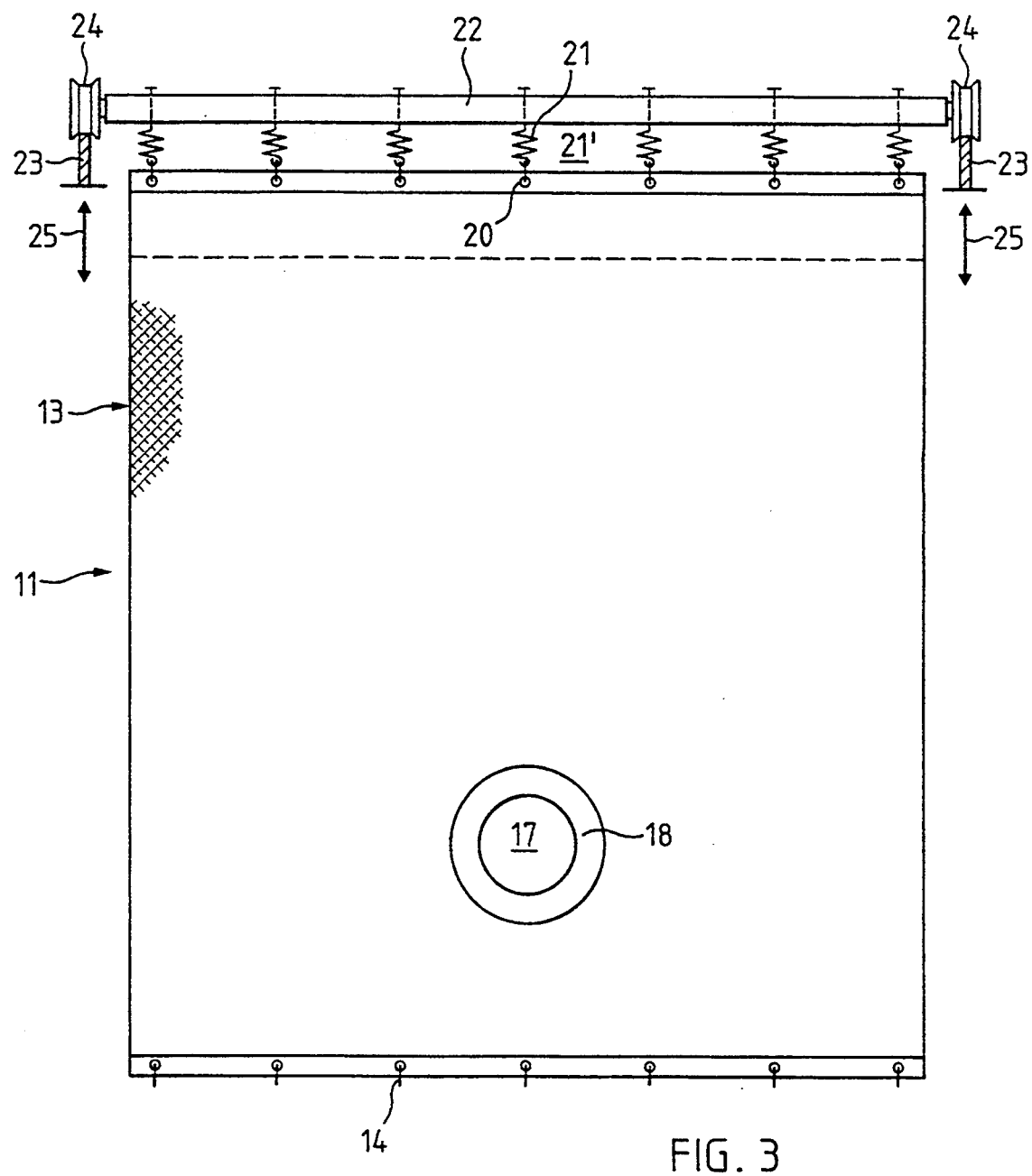
FIG. 3 shows the apparatus according to FIG. 2 in a horizontal view at right angles to the planes of the filter plates.

As a supplement to the invention, the abovementioned lowering and subsequent raising, specified in FIG. 3 by the arrows 25, of the filter cloths 13 can be effected, in particular when the chamber filter press 11 has been completely opened, by a displacement which causes the filter cloths 13 to relax and tighten again. The corresponding displacement amounts to a few centimeters, for example up to 4 cm in a typical filter plate of 1500×1500 cm. If appropriate, the filter cloths 13 may be caused to relax and tighten repeatedly in a rhythmic manner by repeating said procedure a number of times. This results in rhythmically changed shear forces in the filter cloths 13 or rhythmic displacements of individual points of the filter cloths 13 with respect to the parts of the cake located thereon and this causes even the cake or cake portions which may still remain to be dislodged from the filter cloths 13 and made to fall off. Moreover, the rhythmically repeated relaxing and tightening of the filter cloths 13 can, in the case of a small degree of displacement and rapid repetition cycles, be defined as shaking. Shaking the filter cloths 13 in this way has proved to be very effective for dislodging the cake or cake portions remaining thereon.

It should be made clear that the above-described lowering and raising of the filter cloths 13 corresponds in no way to the known procedure. The known procedure involves a somewhat slow movement over a relatively long stretch for peeling the cakes or cake portions from the filter cloths 13. In contrast, the present invention involves a somewhat rapid movement over a relatively short stretch to create a shaking movement which generates shear forces which, for their part, shear away from the filter cloths 13 those cake portions remaining attached on the same. The procedure described here thus essentially differs from the known procedure in the amplitude and periodicity of the movement of the upper edge of the filter cloths 13 with respect to the stationary parts of the chamber filter press 11.

Figure 2:
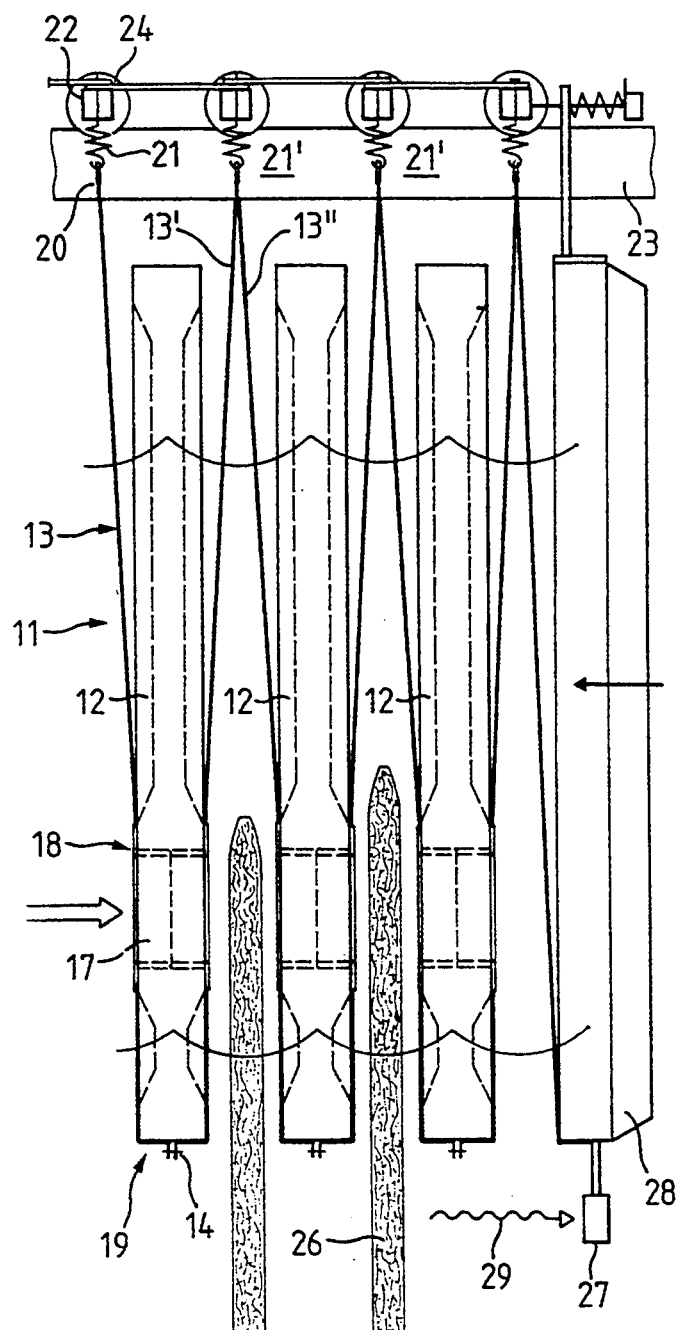
FIG. 2 shows an embodiment of an apparatus according to the invention for dislodging the cake in a chamber filter press, in a horizontal view parallel to the planes of the filter plates.

In order to monitor the complete removal of the filter cake, a photocell 27 may be arranged beneath the filter plates 12, preferably approximately in the vertical plane of the charging tunnel 17, expediently on one of the two head plates of the chamber filter press 11, for example on the head plate 28 as shown in FIG. 2. On the other head plate (not shown) there is arranged a light source (not shown), the light rays 29 of which strike the photocell 27, provided that these light rays 29 are not interrupted by the cake portions which have remained attached. It should be recalled here that, according to experience, the filter cake 26, in practice, remains attached only above the charging channel. If the system of sliding guides or rails, and thus the filter cloths 13 are lowered, for example by approximately 20 cm, in the vertical direction with respect to the chamber filter press 11, as specified in FIG. 3 by the arrows 25, the cake portions which may have remained attached on the filter cloths 13 are thus also lowered and they interrupt the light rays 29, which is signalled by the photocell 27. If the system of sliding guides or rails, and thus the filter cloths 13 are raised up again, the cake portions which may have remained attached on the filter cloths 13 are thus likewise raised and the light rays 29 can once again strike the photocell 27. Consequently, it can be established whether a filter cake 26 has remained attached on one of the filter cloths 13 and, for example, the shaking movement of the system of sliding guides or rails may be switched on again and the entire procedure repeated until, when the system of sliding guides or rails is lowered once again, the photocell 27 signals free passage or no interruption of the light rays 29.

It should be made clear that the lowering and raising, described in the preceding paragraph, of the filter cloth 13 in order to monitor the complete removal of the filter cake with the aid of the photocell 27 is not to be confused with the above-described movement intended to produce shear forces. The movement, described here, for monitoring purposes is effected by the largest possible displacement in order to produce the greatest possible sagging of the filter cloths 13, and this does not run in conjunction with time and has no fixed periodicity. In addition, it does not aim to remove from the filter cloths 13 the cake portions which have remained attached on the same.

In a variant of the apparatus according to the invention, the filter cloths may also be suspended on a resilient crossmember. Instead of running directly on the sliding guides or rails 23 by means of sliding elements or rollers 24, in each case two crossmembers are suspended in pairs on a resilient rocker which, for its part is suspended in its center on the sliding guides or rails and guided perpendicularly and pressed upwards by the force of a restoring spring. When the press is opened, the weight of the filter cake sticking to a pair of filter cloths draws the rocker downwards, counter to the force of the relevant restoring spring. The restoring spring is dimensioned such that the weight of the filter cakes draws the rocker down as far as it will go. If the filter cakes are dislodged from the filter cloths, the rocker then springs back into its upper initial position. If, on the other hand, one of the cakes is not dislodged, or is only partially dislodged, then, due to the cake weight which is still present, the rocker does not reach its upper initial position. This can be established by a sensor, whereupon a mechanical, hydraulic or pneumatic device retrieves the rocker and moves upwards as far as it will go, in as jerky a manner as possible, and shakes until the rocker remains in its upper initial position since the force of the relevant restoring spring is sufficient for this purpose. If all the rockers remain in their upper initial position, then all the filter cloths are tightened and the chamber filter press is empty and can thus be closed again.

I claim:

1. An apparatus for dislodging a cake in a chamber filter press having filter cloths, of which two respective cloths, which are adjacent to each other, are fastened above the filter plates on a common bearing means, and two respective cloths, which enclose a filter plate located therebetween, are fastened on said filter plate in the region of a charging channel, directed at right angles to the filter plates, of the chamber filter press by means of a tubular connecting part and on an underside of said filter plate by means of lashings, while the filter cloths are free laterally with respect to the filter plates and, when the chamber filter press is open, can be stretched by increasing their mutual spacings, wherein the filter cloths are provided in their upper end regions above the filter plates with eyelets in which there is suspended in each case a spring which, for its part, is suspended on a mobile crossmember which, for its part, is supported on the chamber filter press such that it can be displaced essentially parallel to the direction of the charging channel and can move vertically, in each case the upper end of two adjacent filter cloths being fastened together on a series of springs.

2. The apparatus as claimed in claim 1, wherein there are arranged, at the ends of the crossmember, sliding elements via which the crossmember is supported such that it can be laterally displaced on sliding guides fitted on both sides of the chamber filter press.

3. The apparatus as claimed in claim 2, wherein the sliding guides are supported on the chamber filter press such that they can move in a vertical direction.

4. The apparatus as claimed in claim 2, wherein rails are supported on the chamber filter press such that they can move in a vertical direction.

5. The apparatus as claimed in one claim 1, in which the charging channel is arranged at a considerable distance beneath a center of the filter plates and of the filter cloths, wherein a photocell and a light source are arranged beneath the filter plates, as the charging channel, it being possible for light rays originating from the light source to strike the photocell.

6. The apparatus as claimed in claim 5, wherein the photocell and the light source are arranged substantially in the same vertical plane as the charging channel.

7. The apparatus as claimed in claim 1, wherein springs, assigned to two adjacent filter cloths and to a common crossmember, are provided with different degrees of hardness.

8. The apparatus as claimed in claim 1, wherein there are arranged, at the ends of the crossmember, rollers via which the crossmember is supported such that it can be laterally displaced on sliding guides fitted on both sides of the chamber filter press.

9. A method of operating an apparatus for dislodging a cake in a chamber filter press having filter cloths, of which two respective cloths, which are adjacent to each other, are fastened above the filter plates on a common bearing means, and two respective cloths, which enclose a filter plate located therebetween, are fastened on said filter plate in the region of a charging channel, directed at right angles to the filter plates, of the chamber filter press by means of a tubular connecting part and on an underside of said filter plate by means of lashings, while the filter cloths are free laterally with respect to the filter plates and, when the chamber filter press is open, can be stretched by increasing their mutual spacings, wherein the filter cloths are provided in their upper end regions above the filter plates with eyelets in which there is suspended in each case a spring which, for its part, is suspended on a mobile crossmember which, for its part, is supported on the chamber filter press such that it can be displaced essentially parallel to the direction of the charging channel and can move vertically, in each case the upper end of two adjacent filter cloths being fastened together on a series of springs, comprising the steps of opening the chamber filter press and alternatively lowering and raising up the crossmember a number of times producing shear forces, and lowering and raising up again said crossmember allowing the filter cloths sag as much as possible.

10. A method for operating an apparatus for dislodging a cake of a chamber filter press, comprising the steps of
opening the chamber filter press,
alternatively lowering a crossmember and raising it up again by a
displacement intended to produce shear forces,
wherein, when the chamber filter press is opened and after the crossmember has been alternately lowered and raised up again a number of times in order to produce shear forces, said crossmember is lowered and raised up again in order to make a filter cloths sag as much as possible.

* * * * *